United States Patent [19]

Ryan

[11] 4,438,955
[45] Mar. 27, 1984

[54] ACUTE ANGLED VESSEL CONNECTOR

[75] Inventor: Bobby W. Ryan, Houston, Tex.

[73] Assignee: WFI International, Inc., Houston, Tex.

[21] Appl. No.: 341,559

[22] Filed: Jan. 21, 1982

[51] Int. Cl.³ .............................................. F16L 13/02
[52] U.S. Cl. ...................................... 285/189; 285/286
[58] Field of Search ................................ 285/189, 286

[56] References Cited

U.S. PATENT DOCUMENTS

| | | | |
|---|---|---|---|
| 1,883,439 | 10/1932 | Adams | 285/189 |
| 2,425,470 | 8/1947 | Hart | 285/189 |
| 3,062,567 | 11/1962 | De Witt | 285/189 |
| 4,234,217 | 11/1980 | Sakamoto et al. | 285/189 X |

FOREIGN PATENT DOCUMENTS 1042643  11/1978  Canada ................................. 285/189

Primary Examiner—Thomas F. Callaghan
Attorney, Agent, or Firm—Pravel, Gambrell, Hewitt, Kirk & Kimball

[57] ABSTRACT

An acute angled vessel connector including a generally cylindrical main body having an interior body bore and an exterior wall which is at least in part cylindrical and a contoured mounting rim formed integrally with one end of the main body, the mounting rim being generally elliptical in configuration and being positioned at a predesignated acute angle with respect to the central axis of the interior body bore, the mounting rim being adapted for welding in a flush position in an opening in a vessel or pipe such that the generally cylindrical main body and the interior cylindrical body bore extend at a predesignated acute angle with respect to the surface of such vessel or pipeline.

5 Claims, 5 Drawing Figures

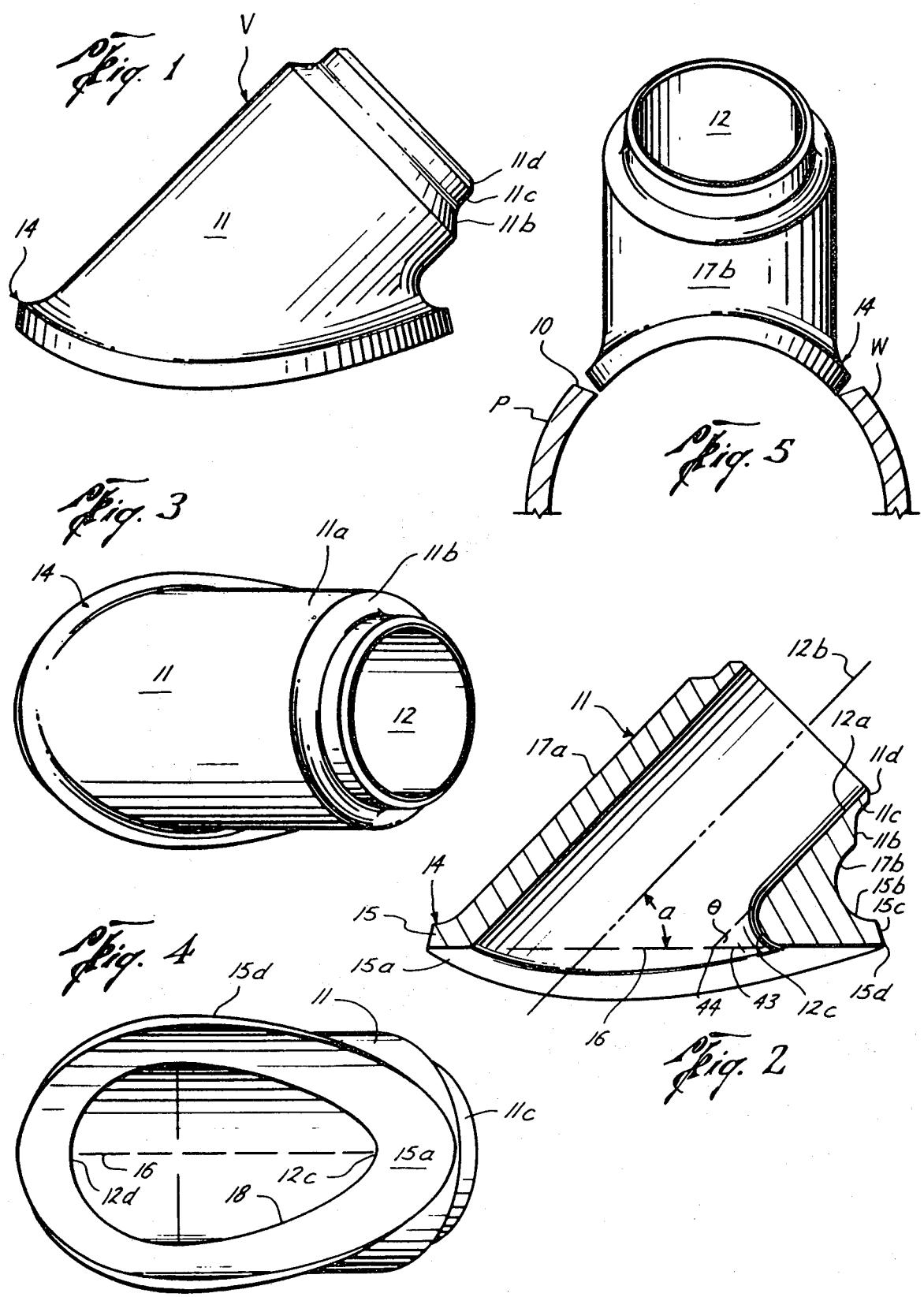

4,438,955

ACUTE ANGLED VESSEL CONNECTOR

CROSS REFERENCES TO OTHER APPLICATIONS

This application is related to a United States Design Patent application Ser. No. 341,560 filed on the same date herewith, which Design application is invented by the same inventor as the utility invention of this application and is assigned to the same assignee. A utility patent application Ser. No. 341,554 on the method of manufacturing the product of this invention is also filed on the same date as this patent application.

TECHNICAL FIELD OF THE INVENTION

The field of this invention relates to vessel connections.

Vessel connectors for connecting branch piping to vessels on pipelines are well known in the field of industrial construction. Typically, a vessel connector is a one-piece metal coupling having a bore therethrough and having some type of end portion adapted to be welded onto or into the wall of a vessel or other pipeline. The other end of the vessel connector typically has a beveled edge, socket or threaded end which is adapted to be attached to a branch piping of some type. Typically, vessel connectors are welded into a vessel or pipeline such that the bore through the vessel connector extends at a right angle or radially with respect to the wall of the vessel or pipeline. In the past, whenever it has been necessary to connect a branch piping to a vessel or pipeline wherein the branch piping is positioned at an acute angle with respect to the wall of the vessel or pipeline, it has been necessary to use a vessel connector of the type just described and in addition to use a short piece of pipe sometimes known as an "elbow" or "el" which is welded to the outer end of the vessel connector and to the branch piping to provide the necessary turn or angled connection between the vessel connector and the branch piping.

In such a situation where it is necessary to use an elbow and a vessel connector to make an angled connection between a vessel or pipeline and branch piping, it is necessary to weld the vessel connector into the vessel or pipeline and also to weld the elbow to the vessel connector and to the branch piping, a total of three welds. Oftentimes, vessel connectors are used in critical industries such as the nuclear industry or dangerous chemical industries where it is necessary that each weld by x-rayed. The labor cost in machining a weld and x-raying or other weld inspecting makes the cost of each weld important. Further, each additional weld is a point of potential weakness and thus the elimination of welds wherever possible is desirable.

One possible solution to this problem has been manufactured for pipeline application. Such a connector, referred to as a "lateral", includes a main tubular body portion adapted to be fitted into a pipeline and further includes a lateral or angled portion providing a passageway which extends off of the main tubular body portion at an acute angle. In order to use a "lateral" connector, it is necessary to insert the main tubular body portion of the connector into the pipeline and to weld it into place at each end of the connector and then to weld the lateral portion of the connector extending outwardly at an acute angle to the branch piping. This type of "lateral" connector does not eliminate any welds and additionally has limited application since it is necessary to weld the main tubular body portion of such a connector directly into the pipeline.

SUMMARY OF THE INVENTION

It is an object of this invention to provide an improved vessel connector wherein the connector can be mounted flush into a pipeline or vessel wall and connected to branch piping positioned at an acute angle with respect to such vessel or pipeline.

The vessel connector of this invention is formed of an integral housing including a generally cylindrical main body having an interior body bore formed of an interior cylindrical wall and an exterior wall which is at least in part cylindrical. A contoured mounting rim adapted to be mounted flush into a vessel or pipeline wall is formed integrally with one end of the main body. The mounting rim is generally elliptical in configuration and is positioned at a predetermined acute angle with respect to the central axis of the interior body bore. The mounting rim is adapted for welding into a flush position in an opening in a vessel or pipeline so that the generally cylindrical main body and the interior cylindrical body bore extend at a predetermined designated acute angle with respect to the surface of the vessel or pipeline.

The connector of this invention provides a strong, unitary connection between a vessel or pipeline and approaching angled branch piping wherein the connector is mounted flush with the wall of the vessel or pipeline with one weld and is connected directly to branch piping with a second weld.

These features and other features relating to the acute angled vessel connector of this invention will be described in greater detail in the description to follow and thereafter, claims will set forth the exact scope of the invention which has been only summarized to this point.

BRIEF DESCRIPTION OF THE DRAWINGS

FIG. 1 is a side view of the acute angled vessel connector of this invention;

FIG. 2 is a side view in cross section similar to FIG. 1;

FIG. 3 is a top view of the acute angled vessel connector;

FIG. 4 is a bottom view of the curved undersurface of the annular mounting rim of the acute angled vessel connector; and FIG. 5 is an end view of the acute angled vessel connector illustrating the flush mounting of the annular mounting rim of the connector into a vessel or pipeline.

DESCRIPTION OF THE PREFERRED EMBODIMENT

Referring to the drawings, the letter V generally designates the acute angled vessel connector of the preferred embodiment of this invention. The acute angled vessel connector is adapted to be mounted in a vessel or pipeline P. Typically the vessel or pipeline P includes a cylindrical wall portion W such as that illustrated in FIG. 5. An opening or orifice 10 is cut into the cylindrical wall W in a generally elliptical shape to receive the acute angled vessel connector V.

The acute angled vessel connector V includes a generally cylindrical main body 11 having an interior body bore 12 formed by interior cylindrical wall 12a. The main body 11 further has an exterior wall 11a which is at least in part cylindrical and thus concentric with the interior body bore wall 12a. A contoured mounting rim generally designated by the number 14 is formed integrally with the generally cylindrical main body 11 of the vessel connector. The contoured mounting rim is generally elliptical in configuration (FIG. 4) and is positioned at a predesignated acute angle a with respect to the central axis 12b of the interior body bore 12. The central axis 12b of the interior body bore 12 intersects a plane of the undersurface 15a represented by dotted line 16 in FIG. 2 at the predesignated acute angle a. The contoured mounting rim 14 includes an annular mounting ledge 15 adapted to be mounted in the orifice or opening 10 in the vessel or pipeline P and welded in a flush position in the wall W.

The main cylindrical body outside surface 11a has machined therein a section 11b which is tapered to form a section 11c of reduced diameter with respect to the remainder of the main cylindrical outside wall portion 11a. The section 11c of reduced diameter terminates in a beveled edge 11d which is machined in the section 11c of reduced diameter. The beveled edge 11d is adapted to be positioned in abutment to branch piping and welded thereto so that the main bore 12 will provide a passageway from the vessel or pipeline P to branch piping (which is not shown) approaching the vessel V from an acute angle. It should be understood that means other than the beveled edge 11d may be provided for connection to such branch piping including a socket weld type of end portion or a threaded end portion.

The ledge 15 of the contoured rim 14 formed integrally with the main body 11 of the vessel connector V is a generally elliptically-shaped ledge formed of an upper, exterior surface portion 15b, a welding edge 15c and the annular, curved undersurface 15a. The outer, welding edge 15c of the ledge 15 is adapted to be placed in a flush position adjacent to the opening or orifice 10 in the wall W of the vessel or pipeline P so that weld material may be placed between the edge of the opening 10 and the welding edge 15c to weld the vessel connector V into position in the vessel or pipeline P.

The curved undersurface 15a of the annular ledge 15 is in a curved plane which is designated to be of the same radius of curvature as the inside wall of the vessel or pipeline P so that annular mounting rim 14 fits flush with the inside wall of the vessel or pipeline P. The undersurface 15a of the annular mounting rim has been described as being in a curved plane which is represented by dashed line 16 in FIG. 2. The line 16 and thus the plane in which the curved undersurface 15a is located intersects the central axis 12b of the interior cylindrical body bore at a predesignated acute angle a. The mounting of the annular mounting ledge 15 in a flush position in an opening 10 in a vessel or pipeline P positions the interior body bore 12 such that its central axis 12b intersects the interior of wall W of the vessel or pipeline P at the predesignated acute angle a.

The actual degree or size of the acute angle a will depend upon the application. The purpose of the vessel connector V is to provide a vessel connection directly between a branch piping which is positioned at such an acute angle with respect to the inside and outside walls of the vessel or pipeline P. The angle a represents the predetermined acute angle which may be 45° or other angle between the central axis 12b of the interior body bore 12 and the curved undersurface 15a of the annular mounting ledge 15 of rim 14 of the vessel connector V.

The interior cylindrical side wall 12a of the interior body bore 12 is machined such that the inside wall is concentric with and thus parallel to the cylindrical portion of the outside wall 11a. For the purposes of definition, referring in particular to FIG. 2, the cylindrical portion of the outside wall 11a includes the obtuse portion 17a and the "crotch" cylindrical portion 17b. Referring to FIG. 2, the obtuse portion 17a is generally the lefthand side of the fitting as viewed in FIG. 2 and includes a cylindrical surface area of at least 180° wherein the exterior wall thereof is cylindrical in configuration and thus concentric with the radially inwardly positioned inside wall portion 12a of the bore 12. The crotch portion 17b of the fitting is on the right side of the cross sectional view of the connector illustrated in FIG. 2. The crotch portion 17b of the outer cylindrical body wall 11a includes a portion which is cylindrical and thus is concentric with the inside wall 12a of the bore 12. Below the crotch portion 17b is a curved portion of the upper surface 15b of the ledge 15, which upper surface has a radius of curvature sufficient that the outside rim below the crotch portion 17b is of sufficient width to allow for the x-raying or other inspection of the weld formed with welding edge 15c in that area.

The undersurface 15a of the annular mounting ledge 15 intersects the wall 12a of the bore 12 along the generally elliptical edge 18 which is illustrated in FIG. 4 as being concentric to but spaced from the outer edge 15d of the welding edge 15c. The distance between the outer edge 15d and the inner edge 18 of the undersurface represents the thickness of the curved undersurface 15a. The configuration of the inner edge 18 is thus the same as the configuration of the outer edge 15d and outer welding edge 15c. This configuration represents generally an elliptical shape which is formed generally by the intersection of the cylindrical interior bore wall 12a with the plane of the curved undersurface 15a of the annular mounting ledge 15. As viewed in FIG. 4, wherein the line 16 represents the centerline of the generally elliptical inner edge 18 of the annular mounting ledge (as well as a line within the plane of the undersurface 15a as illustrated in FIG. 2), the distance from any point on the centerline 16 to directly opposing points on the outer edge 18 is equal so that the generally elliptical edge 18 is congruous with respect to line 16.

When the vessel connector V is positioned in a vessel or pipeline P and receives fluid, gas or liquid, flowing outwardly of the vessel or pipeline to the branch piping welded onto the beveled end 11d, the flow of the fluid into the interior body bore 12 is such that the interior bore portion 12c positioned inwardly from the outside, crotch portion 17b of the vessel may receive the direct impact of such flowing fluid. In order to reduce turbulence within the area or zone of the interior bore portion 12c which receives the direct impact of fluid flow, the interior bore portion 12c is machined to a radius of curvature which is equal to the radius of curvature of the upper surface 15b of the ledge 15 positioned directly outwardly from such bore zone 12c which receives direct fluid impingement. The radius of curvature of this zone 12c is substantially larger than the radius of curvature of the remaining edge 18, which radius of curvature gradually reduces from a maximum in the area 12c to a minimum in the locus 12d which is located diametrically opposite along imaginary line 16 from the bore zone 12c. The radius of curvature of the edge 18 is machined to smoothly decrease from its maximum in the area 12c to its minimum in the edge area 12d. The radius of curvature in the zone of impact 12c is measured in the plane of the drawing of FIG. 2 perpendicular to the plane of the curved undersurface 15a.

The vessel connector V of the preferred embodiment of this invention is provided for making a welded connection in a vessel or pipeline P and for connection to branch piping positioned at an acute angle with respect to the outside wall of such vessel or pipeline P. The annular ledge 15 of rim 14 of the vessel connector V is of sufficient width to allow for x-raying or other inspection of the weld between welding edge 15c and the wall of opening 10 of the vessel or pipeline P. The undersurface 15a of the vessel connector V is curved to provide an uninterrupted, smooth and flush fit of the undersurface with the inside wall of the vessel connector or pipeline P. Utilization of this connector V reduces the number of welds while providing a connection that may be welded into heavy wall vessels for high pressure or other critical application.

The foregoing disclosure and description of the invention are illustrative and explanatory thereof, and various changes in the size, shape and materials as well as in the details of the illustrated construction may be made without departing from the spirit of the invention.

I claim:

1. An acute angled vessel connector adapted to be mounted in a vessel or pipeline and to provide a high pressure angled connection from such vessel or pipeline to a branch pipe, comprising:

a generally cylindrical main body having an interior body bore formed of an interior cylindrical wall and having an exterior wall which is at least in part cylindrical, said interior body bore having a central axis;

a contoured mounting rim formed integrally with one end of said main body, said mounting rim being generally elliptical in configuration and being at a predesignated acute angle with respect to the central axis of said interior cylindrical body bore, said mounting rim being adapted for welding in a flush position in an opening in a vessel or pipeline such that said generally cylindrical main body and said interior cylindrical body bore extend at said predesignated angle acute with respect to the surface of such vessel or pipeline;

said main body having at its other end means for connecting said vessel connector to a branch pipe;

said contoured mounting rim including a generally annular mounting ledge having an undersurface with an outer edge which is generally elliptical and an inner edge approximately concentric thereto, said inner edge being formed by the intersection of the undersurface of said generally annular ledge and said interior body bore; and said inner edge of said generally annular mounting ledge includes a fluid impact zone wherein the radius of curvature of said inner edge is substantially larger than the radius of curvature of the remaining portions of said edge, said radius of curvature of said inner edge being measured in a direction perpendicular to the plane of said curved undersurface.

2. The structure set forth in claim 1 wherein:

said undersurface of said generally annular mounting ledge has a curvature substantially equal to the curvature of such vessel or pipeline wall into which said annular mounting ledge of said vessel connector is mounted.

3. The structure set forth in claim 2, wherein:

the undersurface of said annular mounting ledge is in a curved plane positioned at said predesignated acute angle with respect to the central axis of said interior body bore.

4. The structure set forth in claim 1, including:

said cylindrical main body includes an exterior crotch portion positioned directly outside of said fluid impact zone of said annular mounting ledge, said crotch portion having substantially the same radius of curvature as said fluid impact zone of said inner edge of said annular mounting ledge, said crotch portion being of sufficient radius of curvature to provide sufficient access to inspect the weld connecting said mounting rim with the vessel or pipeline.

5. The structure set forth in claim 4, wherein:

said fluid impact zone radius of curvature gradually reduces from a maximum adjacent said crotch portion to a minimum along the inner edge at a point diametrically opposite therefrom.

* * * * *

UNITED STATES PATENT AND TRADEMARK OFFICE
CERTIFICATE OF CORRECTION

PATENT NO. : 4,438,955
DATED : March 27, 1984
INVENTOR(S) : Bobby W. Ryan

It is certified that error appears in the above–identified patent and that said Letters Patent are hereby corrected as shown below:

Column 1, Line 50: delete "by" and insert therefor --be--.

Column 6, Line 18: insert --,-- after "claim 1".

Signed and Sealed this

Eleventh Day of September 1984

[SEAL]

Attest:

GERALD J. MOSSINGHOFF

Attesting Officer

Commissioner of Patents and Trademarks